United States Patent [19]

Mazzoni

[11] 4,396,791
[45] Aug. 2, 1983

[54] LAMINATOR THERMOCOUPLE

[75] Inventor: Bruce C. Mazzoni, Pittsburgh, Pa.

[73] Assignee: Mobay Chemical Corporation, Pittsburgh, Pa.

[21] Appl. No.: 268,952

[22] Filed: Jun. 1, 1981

[51] Int. Cl.³ .................... H01L 35/28; G01K 7/02
[52] U.S. Cl. ............................... 136/221; 136/242; 374/141
[58] Field of Search ............... 136/221, 242; 374/141

[56] References Cited

U.S. PATENT DOCUMENTS

| | | | |
|---|---|---|---|
| 2,779,810 | 1/1957 | Horbinski | 136/221 |
| 3,528,126 | 9/1970 | Ernst et al. | 425/4 R |
| 3,579,722 | 5/1971 | Schmidt et al. | 425/4 R |
| 4,060,579 | 11/1977 | Schmitzer et al. | 264/51 |
| 4,120,626 | 10/1978 | Keller | 425/89 |
| 4,259,123 | 3/1981 | Tymkewicz | 136/221 |
| 4,265,117 | 5/1981 | Thoma et al. | 136/221 X |
| 4,279,154 | 7/1981 | Nakamura | 136/221 X |

Primary Examiner—Leland A. Sebastian
Attorney, Agent, or Firm—Gene Harsh; Joseph C. Gil; Lyndanne M. Whalen

[57] ABSTRACT

A device for accurately measuring the temperature of a laminator and the method of using this device. This device is made from a cylindrical body adapted for tension adjustment, a probe, a means for adjusting tension which is positioned between the probe and the cylindrical body, a thermally conductive body attached to the probe and a thermocouple attached to the conductive metal body. This device is positioned perpendicular to a laminator platen during operation of the laminator. The temperature may be read from an appropriate meter to which the thermocouple of the device is attached.

11 Claims, 3 Drawing Figures

LAMINATOR THERMOCOUPLE

BACKGROUND OF THE INVENTION

The present invention relates to a device and a method for measuring the temperature of a heated metal conveyor commonly known as a laminator.

Devices for the continuous production of foam blocks having a rectangular cross-section are well known. These devices typically comprise an endless conveyor belt with sidewalls in which the carrying run of the conveyor belt and the sidewalls are adapted to be covered with a film, a distributing device for a foamable reaction mixture which is located over the inlet end of the conveyor belt and a plurality of mold covers which are placed along the foaming area and fixed to guiding mechanisms. The conveyor belt is frequently a continuous belt-type conveyor consisting of multiple strands of chain with slats of metal (generally steel or aluminum) attached across the chains thereby forming a "belt." These metal slats are commonly called platens. Such devices are described in U.S. Pat. Nos. 3,579,722; 3,528,126; 4,060,579 and 4,120,626. Typically, a foamable reaction mixture is continuously injected into the closed foaming space formed by conveyor belts, lateral side boundaries and a finished section of foam plastic.

The temperature of this closed foaming space must be carefully monitored in producing high quality polyurethane and isocyanurate foams. If the temperature is too low, the product may be undesirably soft. If the temperature is too high, the foaming reaction proceeds too quickly and voids develop in the product. Accurate temperature measurement is difficult, however, due to the movement of the conveyor platens and the likelihood that a device in contact with these platens will get caught between those platens.

One possible approach to measuring the temperature in a laminator makes use of infrared spectroscopy. However, temperatures measured by this method are only accurate to ±3° F. Another disadvantage of this IR method is that measurement of the temperature within the central region of the laminator during the foaming operation would require opening the closed space of the laminator causing heat loss that would deleteriously affect the product foam. This potential heat loss, therefore, precludes temperature measurement by the IR method while the laminator is running. This method has the further disadvantage of being quite expensive.

Laminator temperature may also be measured by means of a pyrometer. With the exception of platinum pyrometers, however, a significant period of adjustment is required. Less expensive pyrometers (i.e., those not employing platinum) are also disadvantageous in that they are only accurate to ±5°-10° F. Pyrometers are also limited in that they can only measure the temperature at the end of the laminator because the conveyor moves too rapidly during operation of the laminator to permit accurate measurement of the temperature.

It would be advantageous, therefore, to have a device capable of accurately measuring the temperature of both the end and middle sections of a laminator during its operation, which device would not get caught between the platens of the conveyor belt and would be both durable and inexpensive.

SUMMARY OF THE INVENTION

It is an object of the present invention to provide a device capable of accurately measuring the temperature of a heated metal conveyor.

It is also an object of the present invention to provide a device capable of accurately measuring the temperature of any and every region of a heated metal conveyor which device may be used during the operation of the conveyor without deleteriously affecting that operation.

It is a further object of the present invention to provide a laminator temperature measuring device that will not get caught between the platens of the laminator which device is both durable and inexpensive.

These and other objects which will be apparent to those skilled in the art are accomplished by the device comprising: (a) a cylindrical body adapted for tension adjustment at its closed end; (b) a probe; (c) a means for tension adjustment which is positioned between the cylindrical body and the probe; (d) a body made of a durable, thermally conductive metal attached to a probe; and (e) a thermocouple attached to the conductive metal body.

DETAILED DESCRIPTION OF THE PREFERRED EMBODIMENTS

Figure 1:
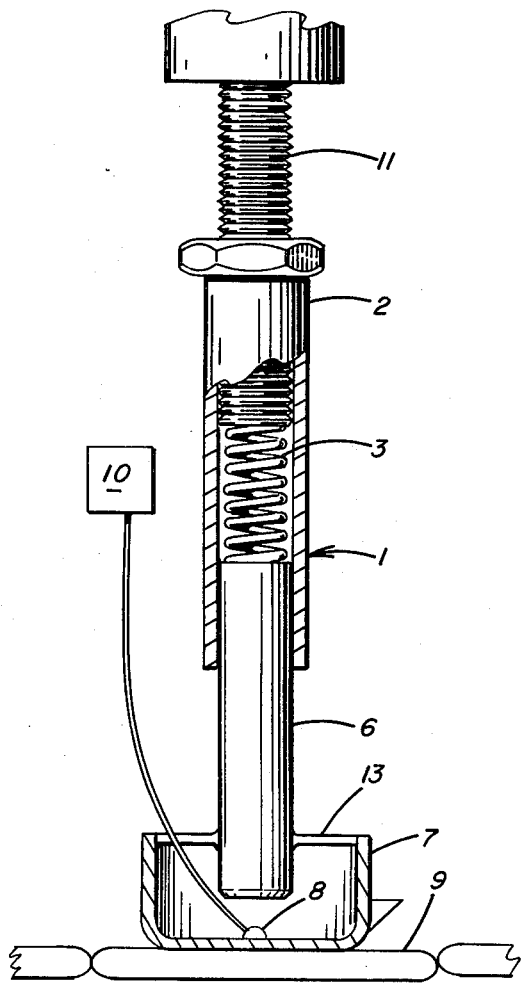
FIG. 1 is a frontal view of one embodiment of the temperature measuring device of the present invention in which the thermally conductive metal body is attached to the probe by an epoxy bond.
Figure 2:
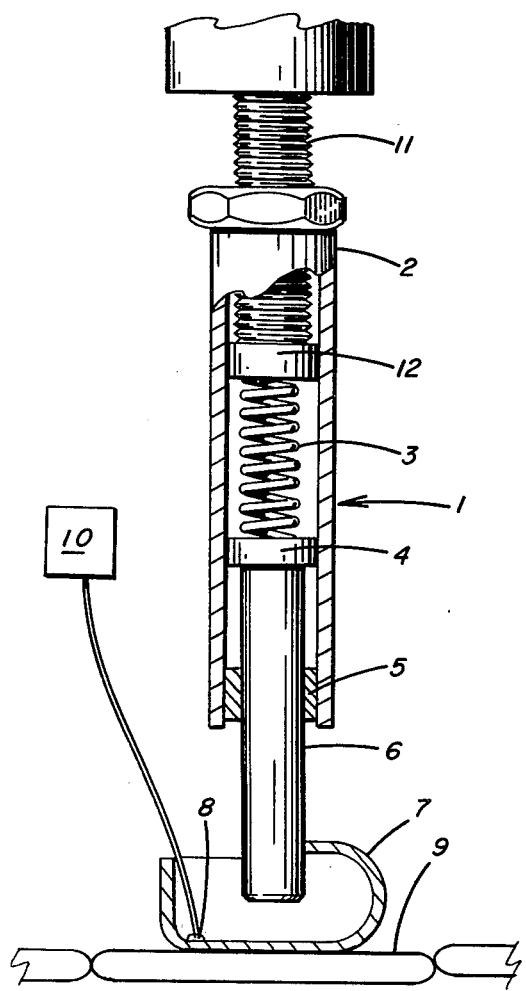
FIG. 2 illustrates a temperature measuring device of the present invention in which the thermally conductive body is a plate curved at one of its ends.

The construction of the laminator temperature measuring device of the present invention may best be described in terms of its elements shown in FIGS. 1 and 2. The laminator temperature measuring device (1) is a cylindrical body (2) which is closed at one end. A probe (6) is located within the cylindrical body. Intermediate the cylindrical body (2) and the probe (6) is a means for tension adjustment (3). This means for tension adjustment may be a spring or some comparable device. Attached to the probe (6) is a thermally conductive body (7) to which is attached a thermocouple (8) connected to a read-out meter (10). The thermally conductive body (7) comes into direct contact with the laminator platens (9). Attached to the cylindrical body (2) at its closed end is a means for adjusting tension (11) which may be set to the "appropriate" length to ensure that the device (1) remains substantially perpendicular to the laminator platens (9).

In the embodiment shown in FIG. 2, spacers (4) and (5) are employed to ensure proper positioning of the probe (6), which has a diameter smaller than the diameter of the cylindrical body (2). Spacer (12) is used to ensure proper positioning of the tension adjustment means (11) which also has a diameter smaller than that of the cylindrical body (2). Proper positioning of both the probe (6) and the means for tension adjustment (12) is essential if the laminator temperature measuring device (1) is to remain perpendicular to the laminator platens (9) during operation of the laminator.

Also, in FIG. 2, the thermally conductive body (7) has at least one curved edge to prevent the device (1) from getting caught between the platens of the laminator.

In the embodiment shown in FIG. 1, the means for adjusting tension (11) has a diameter which is substantially the same as that of the cylindrical body (2). Likewise, the probe (6) is substantially the same in diameter as the cylindrical body (2). The spacers shown in FIG. 2 are, therefore, unnecessary to the device illustrated in FIG. 1. The device shown in FIG. 1 also differs from that of FIG. 2 in that the thermally conductive body (7) in FIG. 1 is attached to the probe (6) by means of an epoxy bond (13). This epoxy bond (13) admits of greater flexibility with respect to the thermally conductive body (7). This embodiment of the present invention is particularly useful in laminators having uneven platens on the conveyor. In the device shown in FIG. 1, the thermocouple (8) is positioned on the face of the thermally conductive body (7) which comes into contact with the platens (9).

The temperature measuring device of the present invention may be positioned above and/or below the closed space of the laminator in a manner such that the thermally conductive body (7) is in contact with the platens. It is advantageous to position several temperature measuring devices at regular intervals both above and below the closed space of the laminator. Such placement enables accurate determination of any temperature differential in the laminator. The most advantageous number of temperature measuring devices and the positioning of such devices will of course depend upon the size of the laminator. Such determination is well within the skill of the art.

Figure 3:
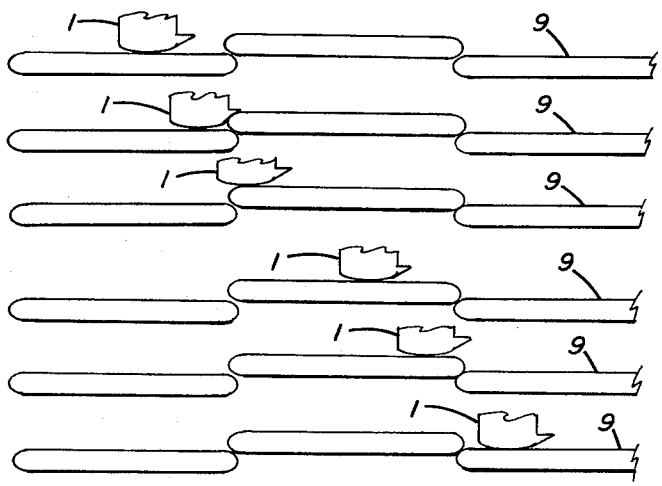
FIG. 3 illustrates changes in the position of the thermocouple which occur with respect to laminator platens during operation of the laminator.

FIG. 3 illustrates the positioning of the temperature measuring device (1) with respect to the platens (9) of a laminator during the operation of the laminator. It is readily seen from this illustration that the temperature measuring device (1) is precluded from being caught between the laminator platens (9) by controlling its length through the tension adjustment means (11). With the exception of this adjustment, the device (1) remains in contact with the laminator platens (9) when the temperature is being measured.

The cylindrical body (2) may be made of any material known to be suitable by those in the art. Brass is one such suitable material which is readily available. A thin brass cylindrical body which is reinforced on its outer wall with steel is particularly advantageous. The means for tension adjustment (11) may also be any suitable device known to those in the art. An adjustable screw is one such device.

The probe (6) may be made of any appropriate material known to those in the art such as an aluminum rod. The thermally conductive body (7) may have any of a variety of shapes provided that the chosen shape has a "face" surface which is sufficiently large to permit significant contact between the thermally conductive body (7) and the platens (9). The conductive body (7) must, of course, be made from a thermally conductive material. Appropriate materials are known to those in the art. Copper, silver, platinum and gold are particularly advantageous because they are highly conductive and soft enough that they do not scratch the platens (9) but hard enough that they will not wear out over a short period of time. Economically, copper is the most preferred material for the conductive body (7).

The epoxy bond (13) of the device in FIG. 2 is preferably achieved by using an epoxy having low thermal conductivity which is nonflammable and has a relatively high heat distortion temperature (e.g., 350°–400° F.). Suitable epoxies are known to those in the art.

The thermocouple (8) may be made from any of a number of known materials. One such material is iron constantan. Likewise, appropriate read-out meters (10) are well known in the art.

Having thus described my invention in detail, the following example is given as illustrative thereof.

EXAMPLE

A device corresponding substantially to that shown in FIG. 1 was constructed. The cylindrical body (2) was made of brass and had an inner diameter of 0.375 inches, an outer diameter of 0.410 inches and a length of 6 inches. Two springs, each having a length of 1.25 inches, were employed as the means for tension adjustment (3). A screw (4-$\frac{1}{2}$ inches in length) and a bolt ($\frac{5}{8}$ inch nut) were used as the tension adjustment means (11). The probe (6) was an aluminum rod having a diameter of 0.360 inches and a length of 2.5 inches. The epoxy used in forming the epoxy bond (13) had a thermal conductivity between 20 and 240 btu/hr. (ft.$^2$) (°F.ft.), was nonflammable, had a heat distortion temperature of 350°–400° F. and a maximum service temperature of 500° F. The thermally conductive body (7) was a copper cap having a hardness of 45 (Brinell), a melting point of 1980° F. and a thermal conductivity of 2700 btu/hr. (ft.$^2$) (°F./ft.). The thermocouple was made of iron constantan, had a diameter of 0.032 inches and special limit of error of ±1.2° F.

This temperature measuring device was used in a run of a laminator in which the temperature was also measured simultaneously by known methods employing a wire thermocouple and a platinum pyrometer. The results are presented in the following table:

| Reading No./ Device | Invention Device | Wire Thermocouple | Platinum Pyrometer |
| --- | --- | --- | --- |
| 1 | 120° F. | 111° F. | 120° F. |
| 2 | 132° F. | 120° F. | 132° F. |
| 3 | 158° F. | 141° F. | 158° F. |
| 4 | 123° F. | 109° F. | — |

These results clearly show that the device of the present invention is as accurate as a calibrated pyrometer and more accurate than standard wire thermocouples. The present invention is, however, much cheaper to make and use than a pyrometer and may be more easily used in the course of operating the laminator.

It will be understood that the above description of the present invention is susceptible to various modifications, changes and adaptations, and the same are intended to be comprehended within the meaning and range of equivalents of the appended claims.

What is claimed is:

1. A device capable of accurately measuring the temperature in a heated laminator comprising:
   (a) a cylindrical body which is adapted for tension adjustment at its closed end,
   (b) a probe,
   (c) a means for adjusting tension which when set in the appropriate manner ensures that the temperature measuring device remains substantially perpendicular to the laminator, the tension adjusting means being positioned between the probe and the cylindrical body, (d) a thermally conductive body attached to the probe, and (e) a thermocouple attached to the conductive metal body.

2. The device of claim 1, wherein the thermally conductive metal is attached to the probe by means of an epoxy bond.

3. The device of claim 1, wherein a spring is the means for tension adjustment positioned between the cylindrical body and the probe.

4. The device of claim 1, wherein the conductive metal body is made of copper.

5. The device of claim 1, wherein the probe is made of aluminum.

6. The device of claim 1, wherein the conductive metal body has a curved edge.

7. A device capable of accurately measuring the temperature of a heated metal conveyor comprising:

(a) a cylindrical body which is adapted for tension adjustment at its closed end, (b) a means for tension adjustment located within the cylindrical body which when set in the appropriate manner ensures that the temperature measuring device remains substantially perpendicular to the conveyor, (c) a probe slidably located within said cylinder and which is in contact with the means for tension adjustment (b), (d) a curved body made of a durable, thermally conductive metal attached to said probe, and (e) a thermocouple attached to said conductive metal body.

8. A device capable of accurately measuring the temperature of a heated laminator during operation of the laminator comprising:

(a) a cylindrical body adapted for tension adjustment at its closed end, (b) a means for adjusting tension connected to a second closed end of the cylindrical body which means when set in the appropriate manner ensures that the temperature measuring device remains substantially perpendicular to the laminator, (c) a probe attached to the tension adjusting means (b), (d) a curved body made of thermally conductive material which is attached to the probe, and (e) a thermocouple attached to the curved conductive body.

9. A method for measuring the temperature of a heated laminator in which a device comprising:

(a) a cylindrical body which is adapted for tension adjustment, (b) a means for tension adjustment located within the cylindrical body, (c) a probe in contact with the tension adjustment means of the cylindrical body, (d) a thermally conductive body having at least one curved edge which is attached to the probe, and (e) a thermocouple attached to the conductive metal body, which is positioned perpendicular to a platen of the laminator is attached to a read out meter from which the temperature may be read.

10. The method of claim 9, wherein the probe of the device is slidably located within the cylindrical body so that the probe is capable of moving within the cylindrical body.

11. The method of claim 10, wherein the thermally conductive body is curved at at least one of its edges.

* * * * *